US007294221B2

(12) United States Patent
Bramer

(10) Patent No.: US 7,294,221 B2
(45) Date of Patent: Nov. 13, 2007

(54) TRANSLUCENT ARTISTIC MEDIUM AND METHOD FOR MAKING

(75) Inventor: Paul Bramer, San Diego, CA (US)

(73) Assignee: Zod's Art, LLC, Imperial Beach, CA (US)

( * ) Notice: Subject to any disclaimer, the term of this patent is extended or adjusted under 35 U.S.C. 154(b) by 177 days.

(21) Appl. No.: 11/111,190

(22) Filed: Apr. 21, 2005

(65) Prior Publication Data

US 2005/0185985 A1 Aug. 25, 2005

Related U.S. Application Data

(62) Division of application No. 10/365,758, filed on Feb. 12, 2003, now Pat. No. 6,898,883.

(51) Int. Cl.
*B32B 38/14* (2006.01)

(52) U.S. Cl. .................................................... 156/277

(58) Field of Classification Search ................. 156/277
See application file for complete search history.

(56) References Cited

U.S. PATENT DOCUMENTS

| | | | | |
|---|---|---|---|---|
| 141,782 A | | 8/1873 | Frederici | |
| 369,059 A | | 8/1887 | Jacobson | |
| 518,806 A | | 4/1894 | Dillmann | |
| 2,880,541 A | | 4/1959 | Kahn | |
| 3,876,483 A | * | 4/1975 | Holt | 156/100 |
| 3,997,991 A | | 12/1976 | Hayman-Chaffey et al. | |
| 4,127,689 A | * | 11/1978 | Holt | 428/38 |
| 4,661,394 A | * | 4/1987 | Curry et al. | 428/212 |
| 5,144,328 A | | 9/1992 | Blake et al. | |
| 5,174,204 A | | 12/1992 | Meier et al. | |
| 5,217,791 A | * | 6/1993 | Fujita et al. | 428/204 |
| 5,223,357 A | | 6/1993 | Lovison | |

(Continued)

OTHER PUBLICATIONS

Gorman, Anna, "Mexico's Plastic Pesos Fit the Bill," Los Angeles Times, latimes.com, Nov. 24, 2004.

(Continued)

*Primary Examiner*—Melvin Mayes
(74) *Attorney, Agent, or Firm*—Knobbe Martens Olson & Bear LLP.

(57) ABSTRACT

A preferred artistic medium comprises a first translucent sheet having at least one first image presented thereon, a second translucent sheet having a least one second image presented thereon, the second image being substantially identical to the first image, wherein at least a portion of at least one of the first and second sheets is textured in a substantially uncolored area of the image, and wherein the first and second sheets are positioned in proximity to one another and in a relative orientation such that the first and second images are in substantial registration with each other. A preferred method for making an artistic medium comprises placing a first image onto a first textured translucent sheet to produce a first image bearing sheet, the first image comprising a first textured substantially uncolored area; placing a second image onto a second translucent sheet to produce a second image bearing sheet, the first and second images being substantially identical; positioning the first and second image bearing sheets to thereby superimpose the first and second images; and fixing the relative positions of the first and second image bearing sheets to maintain the superimposition of the images.

9 Claims, 4 Drawing Sheets

U.S. PATENT DOCUMENTS

| | | | | |
|---|---|---|---|---|
| 5,449,200 | A | 9/1995 | Andric et al. | |
| 5,741,578 | A | 4/1998 | Sax | |
| 5,806,895 | A | 9/1998 | Sharabani | |
| 5,992,068 | A | 11/1999 | de Saro | |
| 6,142,620 | A | 11/2000 | Sagi | |
| 6,898,883 | B2 * | 5/2005 | Bramer | 40/615 |
| 2003/0051380 | A1 | 3/2003 | Butler | |

OTHER PUBLICATIONS

"Plastic Money Under Review," ABCNEWS.com, Dec. 11, 2002.

* cited by examiner

TRANSLUCENT ARTISTIC MEDIUM AND METHOD FOR MAKING

RELATED APPLICATION INFORMATION

This application is a divisional of U.S. application Ser. No. 10/365,758, filed Feb. 12, 2003, now U.S. Pat. No. 6,898,883, which is hereby incorporated by reference in its entirety.

BACKGROUND OF THE INVENTION

1. Field of the Invention

This invention relates to translucent artistic media. More particularly, this invention relates to translucent artistic media that contain a plurality of translucent image-bearing layers, as well as to methods of making such artistic media.

2. Description of the Related Art

Various translucent artistic media are known in which the artistic effect may be appreciated more fully when the media are backlit, e.g., when a source of illumination is behind the medium and an image in the medium is viewed from the opposite side from the source, so that light from the source of illumination shines through the image to the viewer. The stained glass windows of cathedrals are examples of such translucent artistic media.

Translucent artistic media are typically very difficult to reproduce in a manner that captures the artistic effect experienced when the original is backlit. For example, the artist Paul Bramer has won international acclaim for his mastery of the technique of painting on etched glass. Depending on the size of the work, this technique may involve thousands of individual painstaking steps during which a single sheet of glass is repeatedly etched and painted to produce an image. White areas within the image are depicted by the frosted or cloudy appearance of unpainted etched glass. The resulting translucent works may be appreciated even when viewed without rear illumination, but such rear illumination produces an amazingly lifelike three-dimensional effect that is difficult to appreciate in the absence of the backlighting. A number of these translucent artistic works grace restaurants, businesses, and homes throughout the United States, Mexico, and the Pacific Islands.

Efforts to reproduce such translucent artistic media have not been particularly successful. For example, photographs taken of the translucent works of Paul Bramer do not adequately capture the three-dimensional effect experienced when viewing the backlit original, and neither slides nor transparencies prepared from such photographs convey the total artistic effect.

SUMMARY OF THE INVENTION

A preferred embodiment provides an artistic medium comprising:

a first translucent layer comprising a first surface and a second surface, the first translucent layer further comprising a first image, the first surface comprising a first substantially uncolored area within a portion of the first image, the first substantially uncolored area being textured to a first gloss number of about 70 or less;

a second translucent layer comprising a second image, the second image being substantially identical to the first image;

the first translucent layer being in a substantially fixed position relative to the second translucent layer so that the first image overlies the second image to thereby produce a translucent composite image in which the first and second images are in substantial registry.

Another preferred embodiment provides a method of making an artistic medium, comprising:

providing a first translucent sheet comprising a first surface and a second surface, the first surface being textured on at least a portion thereof to a first gloss number of about 70 or less;

placing a first image on the first translucent sheet to thereby produce a first transferred image on the first translucent sheet, the first transferred image comprising a first substantially uncolored area textured to the first gloss number;

providing a second translucent sheet;

placing a second image on the second translucent sheet to thereby produce a second transferred image on the second translucent sheet, the second transferred image being substantially identical to the first transferred image;

positioning the first translucent sheet and the second translucent sheet so that the first transferred image overlies the second transferred image to thereby produce a translucent composite image in which the first transferred image and the second transferred image are in substantial registry; and fixing the first translucent sheet and the second translucent sheet in a position relative to one another that substantially maintains the substantial registry.

Another preferred embodiment provides a system for making an artistic medium, comprising:

a first translucent sheet comprising a first surface and a second surface, the first surface being textured on at least a portion thereof to a first gloss number of about 70 or less;

means for placing a first image on the first translucent sheet to thereby produce a first transferred image on the first translucent sheet, the first transferred image comprising a first substantially uncolored area textured to the first gloss number;

a second translucent sheet;

means for placing a second image on the second translucent sheet to thereby produce a second transferred image on the second translucent sheet, the second transferred image being substantially identical to the first transferred image;

means for positioning the first translucent sheet and the second translucent sheet so that the first transferred image overlies the second transferred image to thereby produce a translucent composite image in which the first transferred image and the second transferred image are in substantial registry; and means for fixing the first translucent sheet and the second translucent sheet in a position relative to one another that substantially maintains the substantial registry.

In preferred embodiments, the translucent composite image is a reproduction of a corresponding image previously rendered in a different artistic medium. For example, in a particularly preferred embodiment, the translucent composite image is a reproduction of a translucent work of Paul Bramer previously rendered in a painting on etched glass.

These and other embodiments are described in greater detail below.

BRIEF DESCRIPTION OF THE DRAWINGS

These and other aspects of the invention will be readily apparent from the following description and from the appended drawings (not to scale), which are meant to illustrate and not to limit the invention, and wherein.

DETAILED DESCRIPTION OF THE INVENTION

Figure 1:
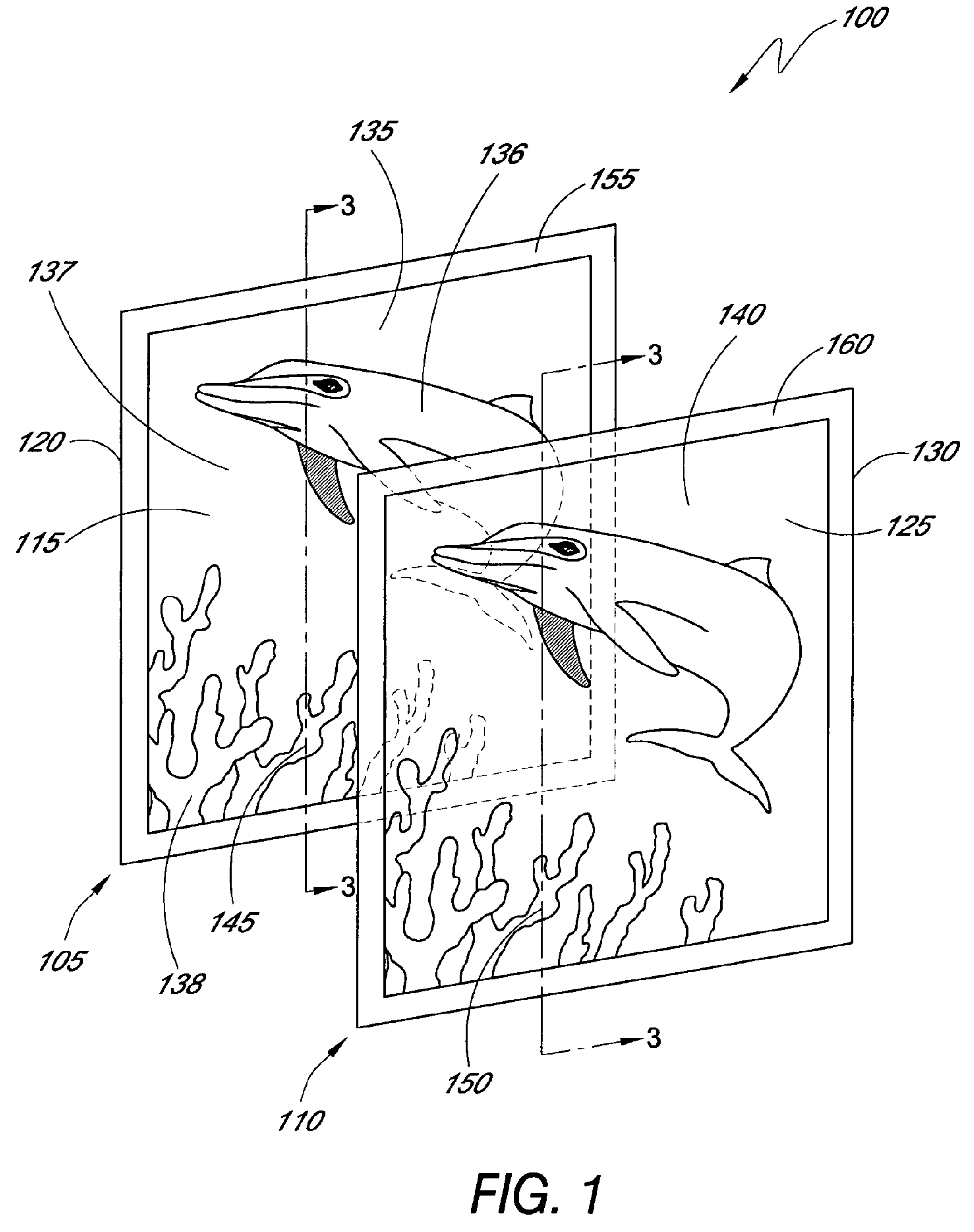
FIG. 1 shows an exploded perspective view of a preferred artistic medium.

This invention is directed to artistic media and methods for making such artistic media. As used herein, the terms “artistic medium” and “artistic media” are used in their ordinary sense to refer to materials in which or onto which art is rendered. Preferred artistic media comprise at least two translucent layers, each of which bears an image that is substantially identical to the other, the layers being positioned so that the images overly one another to produce a translucent composite image. A non-limiting example of such an artistic medium is illustrated in FIG. 1 (discussed in greater detail below). As used herein, the term “translucent” is used in its ordinary sense to describe a material or structure that at least partially transmits light. Non-limiting examples of translucent materials thus include transparent materials that transmit all or nearly all incident light, such as the types of glass and plastic used to make ordinary windows, eyeglass lenses, protective covers for framed pictures, etc., as well as materials that partially transmit light, such as versions of the above-mentioned materials that are hazy, frosted, tinted, and/or colored.

Reference is now made to a preferred embodiment illustrated in FIG. 1. In this embodiment, an artistic medium 100 comprises a first translucent layer 105 and a second translucent layer 110. The first translucent layer 105 comprises a material such as plastic having a first surface 115 and a second surface 120 which is opposite the first surface, and the second translucent layer 110 likewise comprises a material such as plastic having a third surface 125 and a fourth surface 130 which is opposite the third surface. Each of the layers comprises an image, the images being substantially identical to one another. Layers comprising images may be referred to herein as “image bearing” layers or sheets, and/or as layers or sheets comprising a “transferred” image, as described in greater detail below. The images may be contained within the layers or on either surface thereof. For example, in the illustrated embodiment, the first translucent layer 105 comprises a first image 135 on the first surface 115, and the second translucent layer 110 comprises a second image 140 on the third surface 125, the first image 135 and the second image 140 being substantially identical to one another. The images are considered to be substantially identical if any differences between the two images are slight, e.g., minor differences in color, tone, shading, line thickness, shape, etc., are acceptable.

Artistic images typically contain features or parts of features that are white such as clouds, ocean spray, coral, sand, snow, frost, ice, the white part of the eye, teeth, wildlife (e.g., parts of an orca, polar bear, or penguin), etc. It has been found that such features may be advantageously depicted on the surface of a layer by providing an area within the feature in which the surface is textured and substantially uncolored. This invention is not bound by theory, but it is believed that the textured surface scatters part of the incident light, so that the textured surface appears to have a frosted or cloudy appearance, particularly when backlit and viewed from the opposite side. As used herein, the term “textured” is used in its ordinary sense to refer to a surface that has a microscopically rough or grainy surface quality. In practical terms, it is often preferable to characterize the degree of texturing by determining the gloss number of the surface in accordance with ASTM D2457-97. Glossy surfaces may be untextured or slightly textured and thus have a relatively high gloss number of 70 or greater. Semigloss surfaces are typically moderately textured and have a gloss number in the range of 35 to 69. Eggshell surfaces are typically more heavily textured and have a gloss number in the range of 20 to 34. Matte surfaces are typically even more heavily textured and have a gloss number of 6 to 20. Velvet surfaces are relatively highly textured and have a gloss number of 5 or less. Surfaces in preferred artistic media, preferably surfaces comprising substantially uncolored areas within an image, are preferably textured to a gloss number of about 70 or less, more preferably about 50 or less, even more preferably about 30 or less, most preferably about 10 or less, as determined in accordance with ASTM D2457-97.

The degree to which a substantially uncolored area on a surface is textured may be varied as needed to achieve a desirable artistic effect, and is preferably varied to produce various white features within the image. Artists will appreciate that various shades of white exist and that, in order to depict such features or portions thereof, it may be undesirable for the substantially uncolored area to be entirely devoid of color. Thus, artists will understand that a “substantially uncolored” area may include slight amounts of color. For example, it has been found that a textured surface, particularly when backlit with a polychromatic source of light such as the sun, may exhibit a subtle sparkling effect. Such sparkling effects are often seen in nature, such as when sunlight reflects from new fallen snow, and thus may be used to great artistic advantage to realistically depict natural phenomena. Thus, like new fallen snow, the textured surface may display subtle coloring or shading and yet still be considered substantially uncolored. The substantially uncolored area is preferably substantially free of coloring materials (e.g., white ink) in the area depicting the white feature, so that the white appearance is primarily due to the surface texturing.

An example of a surface comprising a substantially uncolored area within a portion of a first image is illustrated in FIG. 1. The first surface 115 comprises a first substantially uncolored area 145 within the first image 135. The first image 135 is an underwater scene comprising various features, including a dolphin 136, ocean water 137 surrounding the dolphin 136, and a coral feature 138. The first surface 115 is textured in the substantially uncolored area 145 so that it scatters incident light as described above, thus producing a frosted or white appearance in areas of the coral 138, including the substantially uncolored area 145. In the illustrated embodiment, the first surface 115 is textured to a first gloss number of about 70 or less across the entire first image 135, including the first substantially uncolored area 145. More preferably, the first gloss number is about 50 or less, even more preferably about 30 or less, most preferably about 5 or less. However, those skilled in the art will appreciate that the texturing may be varied across the first image 135 as needed to achieve the desired artistic effect, and thus that various areas across the first surface 115 may be untextured or textured to varying degrees.

The second layer 110 of the artistic medium 100 illustrated in FIG. 1 comprises a second image 140 comprising a second substantially uncolored area 150. The second image 140 is substantially identical to the first image 135. In the illustrated embodiment, the third surface 125 is textured to a second gloss number of about 70 or less across the entire second image 140, including the second substantially uncolored area 150. More preferably, the second gloss number is about 50 or less, even more preferably about 30 or less, most preferably about 15 or less. The images 135, 140 are considered to be substantially identical to one another even if the degree of texturing in the first substantially uncolored area 145 differs from the degree of texturing in the second substantially uncolored area 150, because both areas 145, 150 are substantially uncolored. For example, in a particularly preferred embodiment, the second gloss number is larger than the first gloss number. It will be understood that the first layer 105 or the second layer 110 may be untextured and thus transparent in the first substantially uncolored area 145 or in the second substantially uncolored area 150, respectively. For example, in an alternative embodiment, the first substantially uncolored area 145 is transparent, and the second substantially uncolored area 150 has a gloss number of about 70 or less. Those skilled in the art will appreciate that, like the first image 135, the texturing may be varied across the second image 140 as needed to achieve the desired artistic effect, and thus that various areas across the third surface 125 may be untextured or textured to varying degrees.

Figure 2:
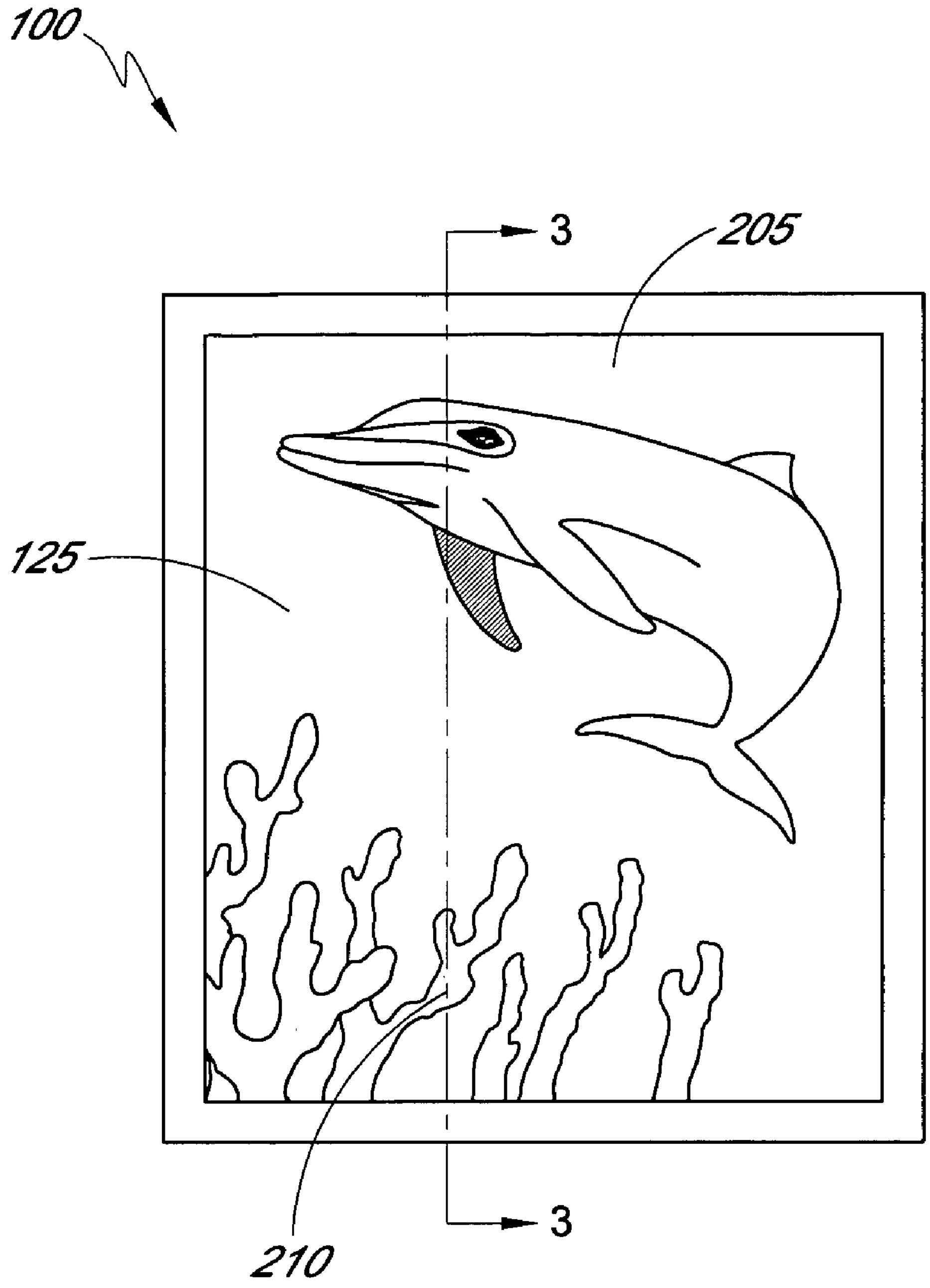
FIG. 2 shows a front elevation view of the preferred artistic medium of FIG. 1.
Figure 3:
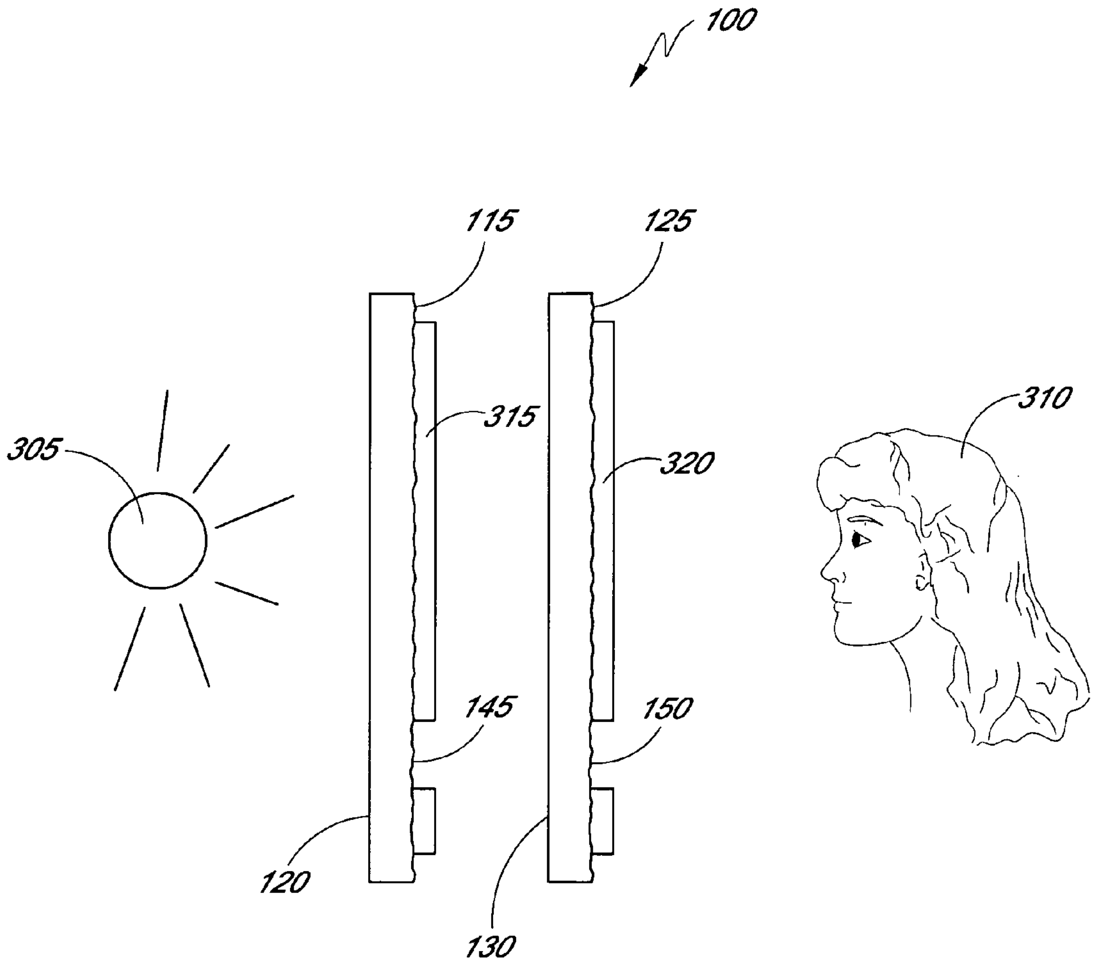
FIG. 3 shows a side cross-sectional view of the preferred artistic medium taken along line 3-3 of FIG. 1.

The position of the first translucent layer 105 is substantially fixed relative to the second translucent layer 110 so that the first image 135 overlies the second image 140 to thereby produce a translucent composite image in which the first and second images are in substantial registry. FIG. 2 shows a front view of the artistic medium 100 illustrated in FIG. 1, depicting a translucent composite image 205. FIG. 3 shows a side cross-sectional view of the artistic medium 100 illustrated in FIGS. 1 and 2. Artists will understand that the translucent composite image 205 may be appreciated as shown in FIG. 3, by backlighting using a light source 305 and observed by a viewer 310 from the opposite side, or the relative positions of the viewer and backlighting may be reversed (not shown). Accordingly, the first translucent layer 105 may be considered to overly or underly the second translucent layer 110, the first image 135 may be within the first layer 105, on the second surface 120, or on the first surface 115, and likewise the second image 140 may be within the second layer 110, on the fourth surface 130, or on the third surface 125. The first and second images are considered to be in substantial registry when identical features in each of the images are superimposed when the translucent composite image is backlit and viewed from the opposite side at an angle perpendicular to the surface. Generally, a high degree of registry is desirable to provide a sharp translucent composite image. However, in some cases it is desirable for artistic purposes to soften the image. It has been found that the image may be softened by a slight degree of misregistration between the images, and thus substantial registry is acceptable.

The first and second images 135, 140 are depicted in FIG. 3 as cross-sectional views of coloring materials (e.g., ink) 315, 320 deposited onto the first and third surfaces 115, 125, respectively. It is understood that FIG. 3 is not to scale and that the layers formed by the coloring materials 315, 320 may be, and preferably are, much thinner than shown. In preferred embodiments, the deposited coloring materials do not fill the contours of the surface texturing, e.g., do not fill the valleys present between the peaks on the textured surface. In accordance with a preferred embodiment, FIG. 3 shows that the substantially uncolored areas 145, 150 are bare (free of coloring materials applied to the surface, e.g., free of white ink), and thus the white appearance produced in the corresponding area 210 of the resulting translucent composite image 205 results from surface texturing, not white coloring.

The substantially fixed position of the first translucent layer 105 relative to the second translucent layer 110 may be achieved in various ways. For example, the layers may be attached to one another using an adhesive positioned between the layers. Such an adhesive is preferably clear if present on the surface of the first and second images 135, 140. Preferably, adhesive is positioned at the edges 155, 160 of the layers 105, 110, not in the interior areas of the layers 105, 110, to avoid undesirable alteration of the translucent composite image 205. The layers may also be attached to one another by heat bonding, e.g., by first heating one or both of the layers (again, preferably at one or more points along the edges 155, 160) to soften or melt the material from which the layer is constructed, and then pressing the layers together and cooling. Such heat bonding methods are known in the art and are preferred when the first and/or second layer comprises a plastic, as discussed in greater detail below. The substantially fixed position of the first translucent layer 105 relative to the second translucent layer 110 may also be achieved mechanically, e.g., by attaching the edges 155, 160 of each layer 105, 110 to a common frame (not shown), by attaching each layer to a separate frame and then attaching the separate frames to one another (not shown), etc. The positions of the layers are considered to be "substantially" fixed relative to one another. For example, for several of the above-mentioned configurations, only portions of the facing surfaces of the layers are directly attached to one another, and thus some relative movement is permitted between portions of the facing surfaces of the layers that are not directly attached to one other.

When in a substantially fixed position, the distance between the layers is preferably effective to produce a translucent composite image having the desired artistic effect, and may be determined by routine experimentation. For example, in the illustrated embodiment, the distance between the first translucent layer 105 and the second translucent layer 110 is preferably about 10 millimeters (mm) or less, more preferably about 5 mm or less, most preferably about 1 mm or less. Preferably, the distance between the two layers is relatively constant over the entire surfaces of the layers, although it is acceptable for one portion of the first translucent layer 105 to be slightly closer to the second translucent layer 110 than some other portion.

The translucent layers in the artistic media described herein may comprise various materials such as glass or plastic, preferably plastic. Each of the layers may comprise different materials or, preferably, all of the layers may comprise the same material. Plastics may comprise one or more polymers. Useful classes of polymers include polycarbonates, epoxies, polyacrylates, polymethacrylates, polyesters, silicones, and polyolefins. Examples of useful polymers include poly(methylacrylate), poly(methylmethacrylate), poly(vinyl chloride), poly(vinylidene chloride), polycarbonate, poly(vinyl butyral), poly(ethylene), ethylene/1-alkene copolymer, poly(ethylene terephthalate), poly(acrylonitrile), poly(butadiene), polystyrene, acrylonitrile-butadiene-styrene (ABS) terpolymers, allyl diglycol carbonate polymer, poly(methyl pentene), polyamide (e.g., nylon), poly(2,6-dimethyl-1,4-phenyleneoxide), poly(vinyl methyl ether), epoxy polymer, silicone polymer, and blends, mixtures, and copolymers thereof. Such polymers are commercially available or may be synthesized using known techniques. Polycarbonate, polyacrylate, poly(methyl)methacrylate, poly(vinyl chloride), and polystyrene are highly preferred. Polycarbonate, available commercially under various tradenames, e.g., Lexan®, is particularly preferred. The translucent layers are preferably in the form of sheets having substantially uniform thickness. The thickness of each layer is preferably about 25 mils or less, more preferably about 15 mils or less, most preferably in the range of about 3 to about 10 mils.

The embodiment illustrated in FIG. 1 contains two translucent layers, but it will be appreciated that artistic media may comprise additional translucent layers. Such additional layers may contain one or more images, and such images may be the same as, or different from, the two substantially identical images described above. The images in such additional layers are preferably chosen and placed for their artistic effect. Alternatively, such additional layers may be substantially free of images and may be included in the artistic medium for various purposes, e.g., to function as an adhesive bond between image bearing layers, to modify the mechanical properties of the artistic medium (e.g., to increase rigidity), to act as a spacer between the image bearing layers, and/or to protect the image bearing layers. In a preferred embodiment, the artistic medium comprises two translucent image bearing layers, and further comprises a first transparent layer and a second transparent layer, the two translucent image bearing layers being sandwiched between the first transparent layer and the second transparent layer. The transparent layers may be glass or plastic, preferably plastic, and preferably have a thickness that is effective to protect the sandwiched translucent image bearing layers from the environment. When a transparent layer is placed in contact with either of the translucent image bearing layers, it is preferred that the surface of the translucent image bearing layer be textured and/or matted to reduce or eliminate the tendency for the interface between the transparent layer and the image bearing layer to produce colored interference effects. The surface of the translucent image bearing layer in contact with the transparent layer is preferably textured to a gloss number in the range of about 6 to about 70, more preferably about 20 to about 70. Alternatively, the surface of the translucent image-bearing layer in contact with the transparent layer may be matted by applying a coating to the surface that has the effect of changing the surface texture. Such coatings are commercially available in various forms from art supply stores, and are commonly referred to as matting agents. A preferred matting agent is BREAKTHROUGH 50-0 CLEAR SATIN, available commercially from Mann Brothers, Los Angeles, Calif.

The artistic medium is preferably protected from the damaging effects of ultraviolet (UV) radiation. In preferred embodiments, the artistic medium comprises a material that absorbs ultraviolet (UV) radiation. UV-absorbing materials are well known to those skilled in the art. For example, the layers or sheets may be fabricated from materials (such as plastics) that contain UV-absorbing additives such as 2-hydroxybenzophenones, oxalanilides, 2-hydroxyphenylbenzotriazoles, 2-hydroxy-phenyltriazines, and hindered amine lights stabilizers (HALS), and/or the layers or sheets can be coated with, matted with, or sandwiched between materials that are (or that contain) UV-absorbers.

Preferred embodiments provide methods for making the artistic media described above. Such methods may be used to create new works of art or to reproduce images previously rendered in a different artistic medium. Thus, in a preferred embodiment, the translucent composite image in the artistic medium is a reproduction of a corresponding image previously rendered in a different artistic medium. For example, the artist Paul Bramer has produced numerous images by painting on a single layer of etched glass as described above. Preferred methods for creating new works of art and for reproducing images previously rendered in different artistic media are described in detail below.

Figure 4:
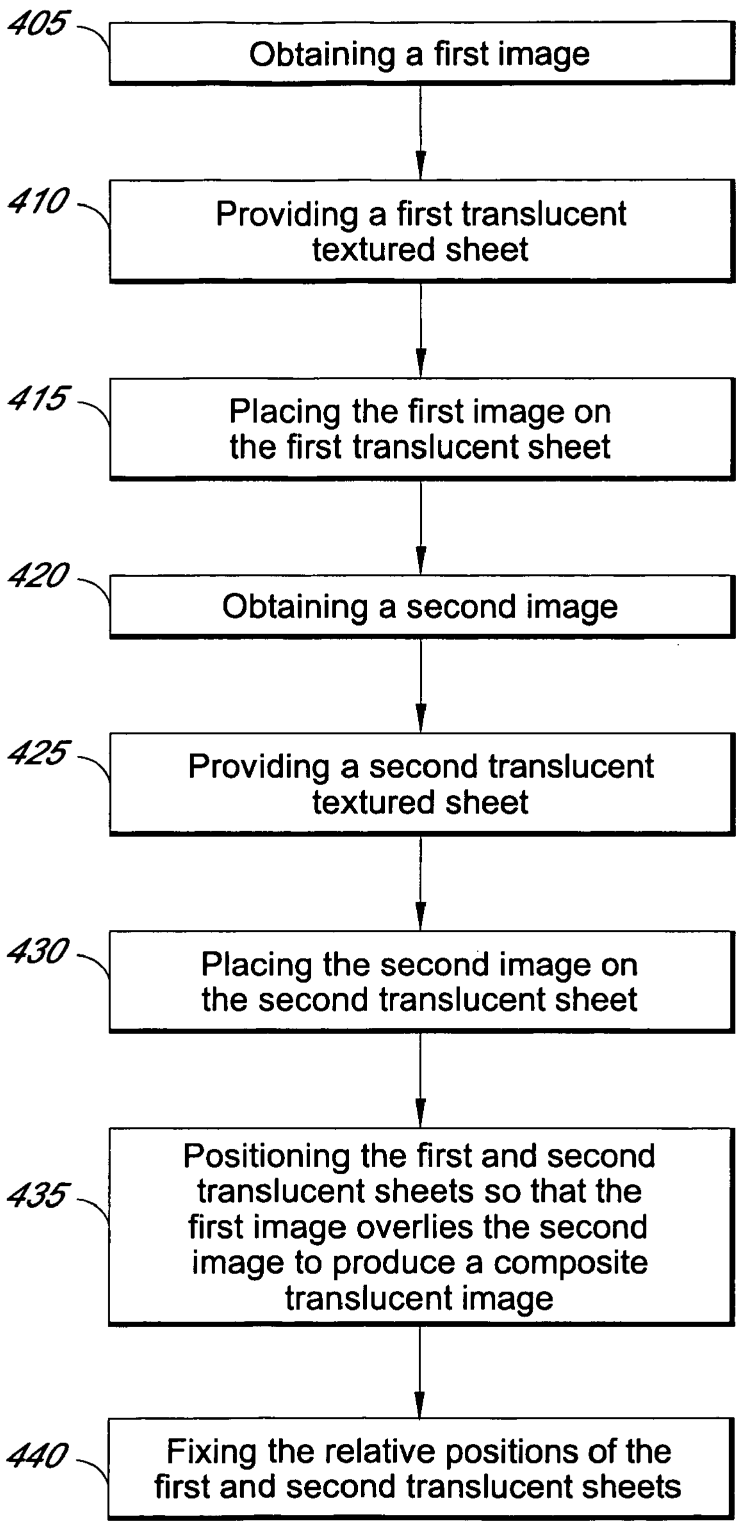
FIG. 4 shows a flow chart illustrating a preferred method of making an artistic medium of the present invention.

The flow chart shown in FIG. 4 summarizes various stages involved in a preferred method of making an artistic medium. Generally, the illustrated embodiment involves making first and second translucent image-bearing sheets, at least one of which is textured on a least portion thereof, positioning the translucent image-bearing sheets so that substantially identical images on each sheet are superimposed to create a composite image in which the images are in substantial registry; and fixing the relative positions of the translucent image-bearing sheets to substantially maintain the substantial registry.

The method illustrated in FIG. 4 is initiated at a step 405 in which a first image is obtained. Various methods known to those skilled in the art may be used for obtaining the first image at step 405. For example, the first image may be obtained by photographing a subject to obtain a subject photograph, by copying an existing photograph or painting (e.g. by scanning or photocopying), or by creating a new image in an artistic medium, e.g. by painting. A suitable image may also be created by an operator using a computer equipped with suitable image-rendering software. Preferably, the first image is stored on a computer by methods known to those skilled in the art, e.g., by creating the image on the computer, by importing a pre-existing image file, by scanning a subject photograph to create an image file and then exporting it to the computer, etc. Use of a computer permits such images to be altered before being placed onto the translucent sheet, e.g., by using commercially available image-altering software.

In a preferred embodiment, the image obtained at step 405 is an image previously rendered in a different artistic medium. For example, a translucent work of the artist Paul Bramer is photographed and the resulting subject photograph is scanned into a computer in order to store the image until printing and, if desired, edit the image. For example, using the computer software, the image can be cropped to only capture particular portions of the image. During step 405, the image can also be enlarged or reduced and enhanced. Enhancing the image, for instance, could involve editing the colors appearing in the image and retouching or modifying features in the image. While loaded on the computer, other features can be added to the image if desired. For instance, a border can be placed around the image having a selected color and style that further serves to increase the aesthetic appeal of the image. Also, if desired, text or copy can be added. Computers and scanners suitable for performing such functions are widely available from commercial sources. Preferred computer software programs that can be used to edit the image include ADOBE Photoshop, marketed by Adobe Systems, Inc. of San Jose, Calif. These programs are particularly well suited for use on APPLE computers such as a MACINTOSH computer.

The method illustrated in FIG. 4 next moves to a step 410 in which a first translucent textured sheet is provided. The first translucent sheet corresponds to one of the translucent layers in the resulting artistic medium, and thus the preferred features of the first translucent sheet are set forth above in the description of the translucent layers. For example, as indicated above, the translucent sheet may comprise various materials such as glass or plastic, preferably plastic, and at least one surface of the first sheet is textured on at least a portion thereof. Preferably, the first translucent sheet is textured to a gloss number of about 70 or less, more preferably about 50 or less, most preferably about 30 or less.

The method illustrated in FIG. 4 next moves to a step 415 in which the first image obtained at step 405 is placed onto the first translucent textured sheet provided at step 410 to thereby produce a first transferred image on the first translucent sheet. Various methods may be used for placing the first image on the first translucent sheet 415. For example, if the image is embodied in a translucent material, that material may be attached to the translucent sheet. As another example, if the translucent sheet is a photographic film, the image may be placed onto the film by using a camera, following the usual procedures for developing the particular type of film. Preferably, the image is placed onto the first translucent sheet by printing, more preferably by printing onto a textured surface on the first translucent sheet. As used herein, the term "printing" is a broad term that encompasses all manner of processes for applying inks or pigments to selected parts of surfaces, including without limitation offset printing, silk screen printing, laser printing, ink jet printing, electrostatic printing, and contact printing. Preferably, the printing is a process selected from the group consisting of offset printing, silk screen printing, laser printing, and ink jet printing. The image on the first translucent sheet may be referred to herein as a first "transferred" image. In this context, the term "transferred" does not necessarily imply that the initially obtained image is physically moved and placed onto the translucent sheet, and thus it is understood that the transferred image may be a copy of the image initially obtained.

In a preferred embodiment, printing onto the first translucent sheet during step 415 is carried out using a HEIDELBERG printing press. In this embodiment, after the first image has been obtained in step 405, e.g., stored on the computer and edited as desired, photographic film negatives corresponding to the final size of the image on the translucent sheet are prepared from the image. Specifically, a negative is made for each color that will be used to print the image onto the translucent sheet. For example, if the image is going to be generated using a four color scheme, four negatives will be made corresponding to each color. It has been found that almost any image or scene can be placed onto a translucent plastic sheet using only inks having the following colors: cyan (dark blue), magenta (deep purplish red), yellow and black. Through the use of the above colors, nearly any desired color can be created on the translucent sheet by printing the colors one on top of the other in a selected manner. Other color schemes may also be used, e.g., five color, six color, seven color, eight color, or nine color. In order to create such negatives from the computer image, a film processor can be used. For instance, one particular film processor that may be used is the GL 361 ONLINE MAGNUM marketed commercially by The Carnfeldt Company. If desired, the film processor can be connected directly to a computer for producing the negatives.

From each photographic negative, a printing plate can be made for printing the image onto the translucent sheets. More particularly, each printing plate that is produced can be used in a printing machine for applying a particular color, such as a colored ink, to the translucent sheets. One particular device capable of producing a printing plate from a film negative is the AUTOLITH PN 85-negative plate processor marketed by El DuPont de Nemours and Company of Wilmington, Del. Once the printing plates are made, the plates may then be mounted to a printing press. Each color used in the printing press may then be applied sequentially to the translucent sheet until the desired image is generated. Preferably, a HEIDELBERG press is used to apply colored inks to a plastic translucent sheet (preferably, to a textured side of a translucent 10 mil polycarbonate sheet) using a roller located under each color head where each printing plate is mounted. Preferably, each translucent sheet fed to the press has a tip sheet to enable the press to better handle the sheet. Various types of inks known to those skilled in the art may be used for printing, and inks that adhere to the translucent plastic sheet without smearing are preferred. Ultraviolet cured inks are highly preferred.

The first transferred image preferably comprises a substantially uncolored area, and the transferred image is preferably textured in the substantially uncolored area to depict a white area in the resulting translucent composite image as described above. The substantially uncolored area is preferably bare (free of coloring materials applied to the surface, e.g., free of white ink), so that the white appearance produced in the area depicting the white feature is due to the surface texturing. The surface texture in the substantially uncolored area may be created by providing a translucent sheet in step 410 that is textured in a particular area, and then placing the image in that area in step 415 in a manner that superimposes the white area of the resulting transferred image with the substantially uncolored textured surface of the translucent sheet. Preferably, most or all of the surface of the translucent sheet is textured, thus reducing or eliminating the need to align the image with a particular part of the textured translucent sheet.

The method illustrated in FIG. 4 next moves to a step 420 in which a second image is obtained. The second image may be obtained in the same general manner as described above for the obtaining of the first image at step 405. Step 420 may be conducted simultaneously with step 405, e.g., the second image may be obtained at the same time that the first image is obtained, or at a different time. The second image is preferably substantially identical to the first image as described above with respect to the first image 135 and the second image 140. Thus, the images obtained in step 405 and step 420 are considered to be substantially identical if any differences between the two images are slight. For example, minor differences in color, tone, shading, line thickness, shape, etc., are acceptable.

The method illustrated in FIG. 4 next moves to a step 425 in which a second translucent textured sheet is provided. The second translucent textured sheet may be provided in the same general manner as described above for the provision of the first translucent textured sheet at step 410. In a particularly preferred embodiment, the gloss number for one of the translucent sheets is larger than the gloss number for the other. In the illustrated embodiment, both the first and the second translucent sheets provided in steps 410 and 425, respectively, are textured. However, it is not necessary that both sheets be textured. For example, in an alternative embodiment, one sheet is transparent, and another has a gloss number of about 70 or less.

The method illustrated in FIG. 4 next moves to a step 430 in which the second image obtained at step 420 is placed onto the second translucent textured sheet provided at step 425 to thereby produce a second transferred image on the second translucent sheet. The second image may be placed onto the second sheet in the same general manner as described above for the placing of the first image onto the first translucent sheet at step 415. The first and second transferred images are substantially identical, as described above.

The method illustrated in FIG. 4 next moves to a step 435 in which the first and second image bearing sheets produced in steps 415 and 430, respectively, are positioned so that the first transferred image overlies the second transferred image to thereby produce a translucent composite image in which the first transferred image and the second transferred image are in substantial registry. As discussed above, the first and second images are considered to be in substantial registry when identical features in each of the images are superimposed while the translucent composite image is backlit and viewed from the opposite side at an angle perpendicular to the surface. A high degree of registry is typically preferred, but a slight degree of misregistration may be acceptable, depending on the desired artistic effect as discussed above. Positioning of the first and second image-bearing translucent sheets at step 435 may be accomplished by placing the images on the same areas of sheets that are the same size and shape, so that superimposition of the images may be easily achieved by lining up the edges of the sheets. When the sheets have different sizes and/or shapes, and/or when the images are placed in different areas, positioning may be accomplished by backlighting the sheets (e.g., using a light table) and moving one or both of the sheets laterally until substantial registry is obtained, as judged visually by the artist.

The method illustrated in FIG. 4 next moves to a step 440 in which the position of the first and second image-bearing sheets obtained as a result of step 435 is fixed so that the substantial registry of the first and second transferred images is substantially maintained. The relative positions of the image-bearing sheets may be fixed in various ways. For example, the sheets may be attached to one another by applying an adhesive between the layers. Such an adhesive is preferably clear if applied across the surface of the images. Preferably, adhesive is applied to the edges of the sheets and not to the interior portions of the sheet to avoid undesirable alteration of the translucent composite image. The sheets may also be attached-to one another by heat bonding, e.g., by first heating one or both of the sheets (again, preferably at one or more points along the edge) to soften or melt the material from which the sheet is constructed, and then pressing the sheets together and cooling. Such heat bonding methods are preferred when the first and/or second sheet comprises a plastic. The substantial registry between the first and second image-bearing sheets may also be substantially maintained mechanically, e.g., by attaching the edges of each sheet to a common frame, by attaching each sheet to a separate frame and then attaching the separate frames to one another, etc. The positions of the sheets are considered to be "substantially" maintained relative to one another. For example, for several of the above-mentioned configurations, only portions of the facing surfaces of the sheets (e.g., the edges) are directly attached to one another, and thus some relative movement is permitted between portions of the facing surfaces of the sheets that are not directly attached to one other.

It will be appreciated by those skilled in the art that various omissions, additions and modifications may be made to the processes described above without departing from the scope of the invention, and all such modifications and changes are intended to fall within the scope of the invention, as defined by the appended claims.

What is claimed is:

1. A method of making an artistic medium, the method comprising:

providing a first translucent sheet comprising a first surface and a second surface, the first surface being textured on at least a portion thereof to a first gloss number of about 70 or less;

placing a first image on the first translucent sheet to thereby produce a first transferred image on the first translucent sheet, the first transferred image comprising a first substantially uncolored area textured to the first gloss number;

providing a second translucent sheet comprising a third surface and a fourth surface, the third surface being textured to a second gloss number which is larger than the first gloss number;

placing a second image on the second translucent sheet to thereby produce a second transferred image on the second translucent sheet, the second transferred image being substantially identical to the first transferred image;

positioning the first translucent sheet and the second translucent sheet so that the first transferred image overlies the second transferred image to thereby produce a translucent composite image in which the first transferred image and the second transferred image are in substantial registry; and fixing the first translucent sheet and the second translucent sheet in a position relative to one another that substantially maintains the substantial registry;

wherein at least one of the first translucent sheet and the second translucent sheet comprises a plastic.

2. The method of claim 1 in which the act of placing the second image on the second translucent sheet comprises printing the second image onto the third surface.

3. The method of claim 1 further comprising obtaining the first image prior to the act of placing the first image on the first translucent sheet.

4. The method of claim 3 in which the act of obtaining the first image comprises storing the first image on a computer.

5. The method of claim 4 wherein the act of obtaining the first image comprises creating the first image on the computer.

6. The method of claim 4 wherein the act of obtaining the first image comprises photographing a subject to produce a subject photograph.

7. The method of claim 6 in which the subject is a corresponding image previously rendered in a different artistic medium.

8. A method of making an artistic medium, the method comprising:

obtaining a first image;

providing a first translucent plastic sheet comprising a first surface and a second surface, the first surface being textured on at least a portion thereof to a first gloss number of about 50 or less;

printing the first image onto the first surface to thereby produce a first transferred image on the first surface the first transferred image comprising a first substantially uncolored area textured to the first gloss number, the first substantially uncolored area being free of white ink;

obtaining a second image substantially identical to the first image;

providing a second translucent sheet comprising a third surface and a fourth surface, the third surface being textured to a second gloss number which is larger than the first gloss number;

printing the second image onto the second translucent plastic sheet to thereby produce a second transferred image on the second translucent plastic sheet;

positioning the first translucent plastic sheet and the second translucent plastic sheet so that the first transferred image overlies the second transferred image to thereby produce a translucent composite image in which the first transferred image and the second transferred image are in substantial registry; and fixing the first translucent plastic sheet and the second translucent plastic sheet in a position relative to one another that substantially maintains the substantial registry.

9. The method of claim 8 in which the act of printing the second image onto the second translucent plastic sheet comprises printing the second image onto the third surface.

* * * * *